Figure 5:
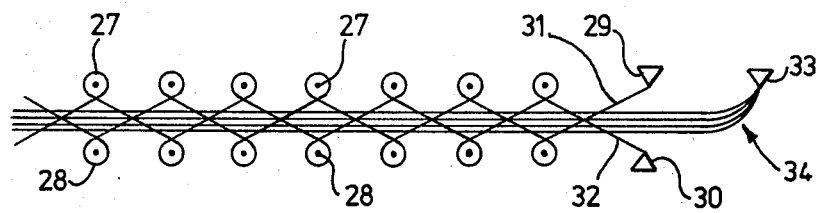

United States Patent [19]

Betts et al.

[11] 4,341,830

[45] Jul. 27, 1982

[54] COMPOSITE STRUCTURE IN THE FORM OF A DISC OF KNITTED CARBON FIBERS

[75] Inventors: Max W. Betts, Coventry; Thomas R. Burrow, Earlsdon; Frank Robinson, Breaston; Patrick A. White, Walsgrave, all of England

[73] Assignee: Courtaulds Limited, London, England

[21] Appl. No.: 111,362

[22] Filed: Jan. 11, 1980

Related U.S. Application Data

[63] Continuation of Ser. No. 847,614, Nov. 1, 1977, abandoned.

[30] Foreign Application Priority Data

Nov. 3, 1976 [GB] United Kingdom ............... 45817/76

[51] Int. Cl.³ ................................................ B32B 3/02
[52] U.S. Cl. ........................................ 428/65; 66/199; 156/148; 188/251 A; 264/29.1; 264/29.2; 264/29.5; 423/447.1; 423/447.2; 427/249; 428/253; 428/254; 428/367; 428/408
[58] Field of Search .............. 428/36, 64, 65, 197, 428/253, 254, 257, 408; 264/29.1, 29.2, 29.5, 60, 81, 82; 66/198, 199, 202; 427/249; 423/447.1, 447.2, 447.6; 188/251 A; 156/148

[56] References Cited

U.S. PATENT DOCUMENTS

| 3,759,353 | 9/1973 | Marin ................................. 428/408 |
| 3,761,231 | 9/1973 | Dowell et al. ...................... 428/408 |
| 3,859,160 | 1/1975 | Marin ................................. 428/408 |
| 3,936,552 | 2/1976 | Krupp et al. ................... 188/251 A |
| 3,956,548 | 5/1976 | Kovac et al. ......................... 428/64 |
| 3,991,248 | 11/1976 | Bauer ................................. 428/408 |
| 3,993,817 | 11/1976 | Schultz ................................ 428/64 |
| 4,155,432 | 5/1979 | Krause ........................... 188/251 A |
| 4,193,252 | 3/1980 | Shepherd et al. ................. 423/447.1 |

FOREIGN PATENT DOCUMENTS

| 504655 | 4/1939 | United Kingdom . |
| 504855 | 5/1939 | United Kingdom . |
| 505105 | 5/1939 | United Kingdom . |
| 505107 | 5/1939 | United Kingdom . |
| 506741 | 6/1939 | United Kingdom . |
| 1190269 | 4/1970 | United Kingdom . |
| 1332789 | 10/1973 | United Kingdom . |
| 1352141 | 5/1974 | United Kingdom . |
| 1362801 | 8/1974 | United Kingdom . |
| 1378886 | 12/1974 | United Kingdom . |
| 1407966 | 10/1975 | United Kingdom . |

OTHER PUBLICATIONS

"Relationship Between Structure and Strength for CVD Carbon Infiltrated Substrates" Kotlensky and Bauer, 1970.

*Primary Examiner*—James J. Bell
*Attorney, Agent, or Firm*—Davis, Hoxie, Faithfull & Hapgood

[57] ABSTRACT

A composite structure such as an aircraft brake disc has a matrix material reinforced by knitted panels of fabric arranged in a stack. The panels are knitted directly into the desired disc shape so that there is no fabric waste, by knitting a helix of fabric on a flat-bed weft knitting machine having a patterning mechanism which allows shaping and a presser foot or sinkers to hold the knitting down on the needles. The helix of fabric can be closed down to constitute the stack of disc panels directly or it can be separated into discrete disc panels by knitting in draw threads connecting successive windings of the helix. The disc panels may be knitted from oxidized acrylic yarn and then heated to carbonise the yarn. A stack of carbon fibre fabric panels may be embedded in a carbon matrix by carbon vapor deposition to form a brake disc.

22 Claims, 7 Drawing Figures

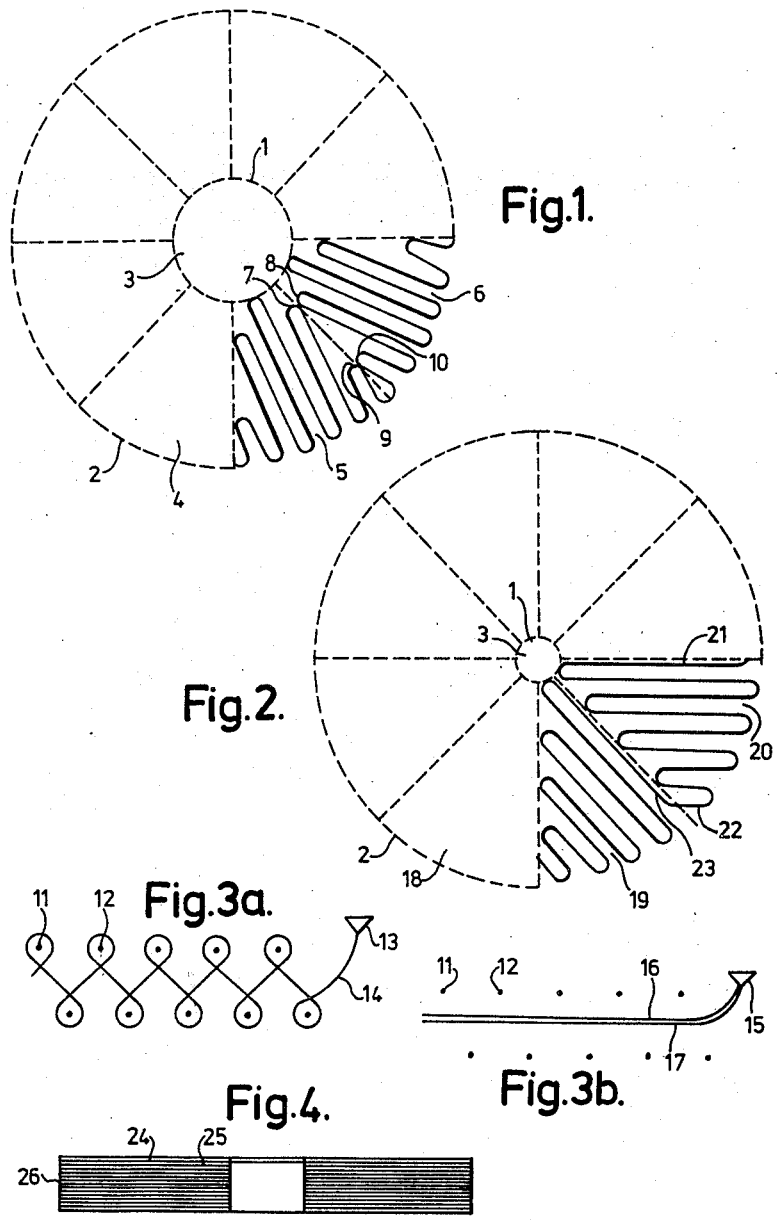

COMPOSITE STRUCTURE IN THE FORM OF A DISC OF KNITTED CARBON FIBERS

This is a continuation of application Ser. No. 847,614, filed Nov. 1, 1977 now abandoned.

This invention relates to a composite structure in which a matrix material is reinforced by fabric. An example of this type of reinforcement in common use is the use of glass fabrics, usually non-woven, to strengthen thermosetting resin constructions such as sailing dinghies. More recently, carbon fibre fabrics have been proposed for reinforcing structures where their high strength is required, for example in aircraft brake discs, as described in British Patent Specification Nos. 1,362,801, 1,378,886 and 1,407,966 where the discs comprise a woven fabric of carbon fibres in a carbon matrix.

According to this invention, a composite structure comprises a matrix material reinforced by a fabric panel or a stack of fabric panels, each panel comprising yarn knitted in courses of varying length which give it the general shape of a disc.

The invention includes a process for making a composite structure comprising knitting yarn in courses of varying length to form panels of fabric each of which is in the general shape of a disc and embedding the panels, singly or as a stack, in a matrix material.

For most end uses the generally disc-shaped panels of knitting will be used in the form of a stack of panels embedded in the matrix, the number of panels in the stack being chosen to give the desired thickness of the composite structure. Such a stack may comprise discrete disc-shaped panels or the panels may each comprise a single winding of a continuous helix of knitted fabric.

Generally disc-shaped fabric reinforcement is required in a number of end uses, including brake discs, clutch plates, and various cylindrical or tubular structures. When woven fabrics are used, as at present for aircraft brake discs, the discs of reinforcing fabric are cut from the woven sheet, giving rise to considerable waste. This waste is eliminated by the present invention because the panels are knitted directly into the required disc shape by the technique of varying the course length. Also the waste yarn used in setting up a loom is avoided.

The knitted structure itself gives advantages over woven fabrics in that there need be no preferential orientation of the yarn as occurs with the warp and weft of a woven fabric. On the other hand, additional strength can be built into a desired direction of the knitted panel by laying in additional yarns preferably along the courses. In particular, with a rib construction, the laid-in yarn can lie straight, with little or no undulation caused by meshing with the knitted yarn, to give maximum fabric strength in the direction of the laid-in yarn. Other useful constructions are an interlock construction and a single jersey construction knitted as a double fabric joined at intervals by knitted stitches.

The knitted structure gives rise to a further advantage in the case when a stack of panels is compressed within the matrix material because the stitches of adjacent panels interfere with each other and provide an improvement in shear strength. In the case when the panels comprise the windings of a helix of knitted fabric, the mechanical connection between the panels gives additional strength.

The generally disc-shaped panels are preferably knitted as a continuous succession of panels by knitting a continuous helix of fabric. Waste and handling are minimised by knitting the helix of a length to give a stack of the desired thickness when the helix is compressed with the windings lying against each other. Alternatively, successive discrete panels may be obtained by knitting draw threads into the helix at the desired angular frequency, 360° in the case of complete discs.

The disc shaped panels may be knitted as a continuous helix on a flat-bed weft knitting machine having the facility to take needles out of the knitting mode and bring them back to that mode so that the course length may be varied, and this can be controlled by a jacquard or other patterning mechanism. The knitting may be held on the needles by suitable means such as a presser foot as described in U.S. Pat. No. 3,613,401 or by sinkers as on a beret machine.

A suitable machine equipped with a presser foot is a V-bed flat knitting machine made by Edouard Dubied et Cie S.A. of Neuchatel, Switzerland under the designation JDRPM. A flat bed beret machine may also be used, but has certain disadvantages in that the single jersey fabric usually knitted on such machines has a tendency to curl at the edges, making laying-up difficult. Also, beret machines usually have no provision for laying in yarns.

The flat bed knitting machines referred to are used to make a helix of fabric by knitting yarn in successive sectors which for simplicity are of substantially equal size and with substantially the same pattern of knitted courses. The shape of each sector may be formed by knitting one or more long courses, which are substantially radial, and then progressively reducing the length of successive courses by progressively taking needles out of the knitting mode until the sector is complete, when all the needles are brought back into action to knit the opening long courses of the next sector. Alternatively, the sectors can be knitted in the reverse of that sequence, starting with a short course and progressively increasing course length. Another variant is to start with a short course, increase up to the longest course and then decrease to a similar short course again.

The techniques of varying the course length during knitting gives great flexibility in controlling the size and shape of the disc-shaped panels, and the facility of controlling the variation to one stitch difference gives great accuracy. The general disc shape may be varied by, for example, leaving a central aperture, as required to accommodate the shaft of a brake disc, and by shaping the peripheral edges of the disc to correspond, for example, to various 'cut-outs' in the final composite structure.

When a central aperture is required, the diameter of this may be controlled according to the number of full length radial courses which are knitted, the diameter increasing as the number of full length courses increases. These courses may be situated together at the beginning, end or middle of a sector as described. However, when there are more than a few such courses in a sector, it can be advantageous to locate some at either end, and the rest intermediately in order to avoid distortion at the periphery of the central aperture.

The output of the Dubied V-bed flat knitting machine referred to may be increased by employing a set of two yarn carriers to feed yarn to the needles such that they each supply alternate courses. As the course length progressively decreases (or increases) as a sector is knitted there is obviously a greater difference in course length between alternate courses than between adjacent courses, so that progressing from one alternate course to the next increases the risk of leaving holes in the fabric. In order to reduce this risk the course pattern may be altered so that there are two sets of alternating courses both of which progressively reduce (or increase) in course length as the knitting proceeds to provide the sector shape, and with the difference in course length between adjacent courses being greater than the difference in course length between alternate courses.

Additional yarn may be laid in along the courses by employing two additional yarn carriers each feeding alternate courses. However, it has been found that machine utilisation can be maximised if for each set of two yarn carriers feeding the needles only one additional yarn carrier is used, laying in only along alternate courses, because in this way a greater number of fabric helixes can be knitted side-by-side on the same needle beds. Thus, on the Dubied machine referred to, one can simultaneously knit four or five helixes of a size suitable for aircraft brake discs compared with only three when two additional yarn carriers are provided for each set of two needle-feeding carriers.

The yarn from which the panels are knitted may be continuous filament yarn or spun staple fibre yarn, and the fibres or filaments may be chosen according to the reinforcing duty required. In this specification, the terms "fibres" and "filaments" are to be understood as being interchangeable except where the sense otherwise dictates.

The knitted panels preferred for the composite structure of the invention comprise carbon fibre yarn. As carbon fibre yarn is brittle and liable to be damaged during knitting a preferred method is to knit the fabric from yarn comprising oxidised fibres suitable as precursors for carbon fibres, with the fabric itself being heated to carbonise the fibres. For greater strength, the preferred precursor yarn comprises fibres which have been heated under oxidising conditions whilst under tension to give a strong blackened fibres which will withstand the carbonisation process without burning up or becoming otherwise adversely affected. One such yarn is a yarn comprising acrylic fibres which have been oxidised in air at a temperature of 200° C.–300° C. whilst held under tension, as described in British Patent Specification No. 1,110,791.

It has been found that such precursor yarn can be knitted very satisfactorily into the desired generally disc-shaped panels.

The invention includes a fabric panel knitted from yarn comprising carbon fibres or oxidised fibres suitable as precursors for carbon fibres and having knitted courses of varying length which give it the general shape of a disc.

When the fabric panel comprises yarn of oxidised precursor fibres, it may be heated to carbonise the fibres. For example, panels comprising yarn of oxidised acrylic fibres may be heated in an inert atmosphere up to a temperature of 1000° C. or more. The panels are preferably carbonised prior to incorporation in the matrix material, but it is also possible to carbonise them (at least in part) in situ together with the matric material. One way of forming a carbon fibre-reinforced carbon matrix comprises carbonising the disc-shaped knitted panels of yarn comprising oxidised precursor fibres, stacking the carbonised panels in a mould, embedding the stack in a thermosetting resin, curing the resin, and subsequently heating the resulting composite to carbonise the resin. The process of carbonising the resin matrix is sometimes referred to as the "resin char" process, and one version of it in relation to filament/resin composites is described in British Patent Specification No. 1,352,141.

Another method of forming a carbon fibre-reinforced carbon matrix is by carbon vapour deposition. This involves heating a carbon fibre fabric in an atmosphere of a hydrocarbon gas such as methane so that carbon is deposited from the gas onto the fabric to build up a carbon matrix around the fabric. The heating is localised to the fabric, for example by induction, and usually the process is carried out under reduced pressure. A description of carbon vapour deposition on woven and non-woven reinforcing fabrics of carbon fibre yarn is contained in the paper entitled "Relationship Between Structure and Strength for CVD Carbon Infiltrated Substrates" by D. W. Bauer and W. V. Kotlensky presented at the 23rd Pacific Coast Regional Meeting of the American Ceramic Society at San Francisco, California, U.S.A., on October 28th and 29th, 1970.

With the carbon vapour deposition process the reinforcing fabric may already be carbonised or it may be carbonised, at least partially, whilst the process is being carried out.

The invention includes a brake disc comprising a carbon matrix in which is embedded a stack of fabric panels of carbon fibre yarn each panel having knitted courses of varying length which give it the general shape of a disc having a central aperture.

Figure 6:
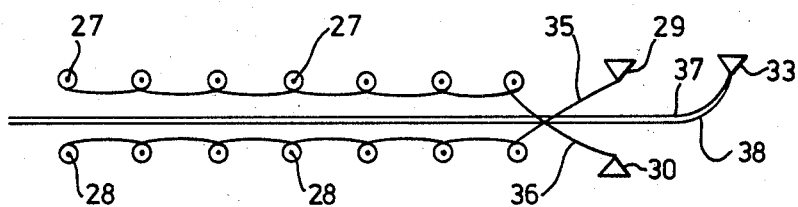
Figure 7:
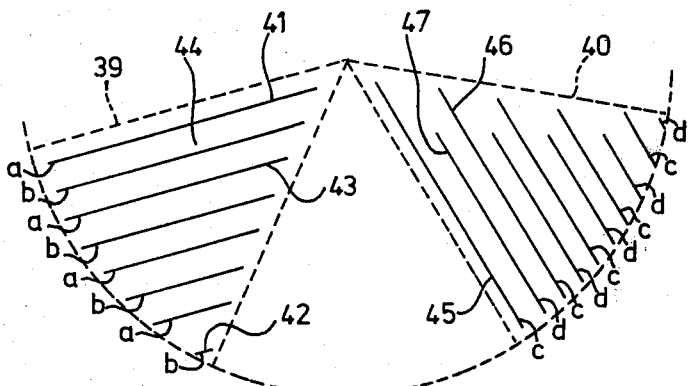

The invention is illustrated by the accompanying drawings, in which:

FIG. 1 is a diagram of a single disc of knitted fabric showing the alignment of the courses of knitting, FIG. 2 is a diagram of a similar disc showing a different alignment of courses, as produced by a beret machine, FIG. 3 is a diagram of the needles in a V-flat knitting machine showing a rib construction with additional yarns laid in, FIG. 4 is a cross-section through a brake disc showing the stack of knitted discs of reinforcing fabric, FIG. 5 is also a diagram of the needles in a V-flat knitting machine but showing an interlock construction, FIG. 6 is a diagram similar to that of FIG. 4 but showing a single jersey construction on both needle beds, and FIG. 7 is a diagram showing two alternative arrangements of courses in a sector of a disc-shaped knitted panel.

The discs shown in FIGS. 1 and 2 may represent discrete discs or single windings (360°) of a continuous helix of fabric. In both Figures the disc has inner and outer peripheries 1 and 2 which are concentric so that the disc has a central aperture 3 to accommodate the shaft of a brake disc.

In FIG. 1, the alignment of the knitted courses is shown as dividing up the annular disc into a number of sectors 4, 5, 6 etc., in each of which the central courses extend across the full width of the annulus in a radial direction, with the courses either side progressively decreasing in length, and progressively moving out of radial alignment. Where two sectors join, corresponding courses 7, 8 and 9, 10 join at an angle approximately equal to that subtended by the sector.

With the above alignment of courses, the annular disc can be strengthened considerably in the radial direction by laying in one or more yarns along the courses. FIG. 3a shows diagrammatically the needles 11, 12, etc. of a V-flat knitting machine, on which a yarn carrier 13 supplies a weft yarn 14 for knitting in a 1×1 rib construction, whilst FIG. 3b shows a yarn carrier 15 supplying two yarns 16 and 17 for laying in-between successive courses of knitting on the same needles. The laid in yarns are held in-between the front and back rib wales without being distorted from a straight path, thereby providing a high degree of reinforcement in the course direction.

In FIG. 2, a typical pattern of course alignment obtained on a beret machine is shown. Again, the disc is divided up into sectors 18, 19, 20, etc. of parallel courses, but in this case each sector starts off with a full width radial course 21, with successive courses gradually reducing in length until, after the final short course 22, all the needles are brought back into action to knit another full width course 23 connected to the previous courses.

FIG. 4 depicts a brake disc in cross-section, showing a stack of annular discs 24, 25, etc. of knitted fabric of carbon fibre yarn embedded in a carbon matrix 26. The stack may comprise discrete annular discs, or a continuous closed-up helix of fabric.

FIG. 5 shows the needle beds 27, 28 of a V-flat knitting machine on which yarn carriers 29 and 30 supply yarns 31, 32 respectively to the needle beds for knitting in the interlock construction shown. An additional yarn carrier 33 lays in four yarns (collectively 34) along alternate courses to produce a compact, heavyweight fabric.

FIG. 6 shows the same needles and yarn carriers shown in FIG. 5 but in this case each needle bed is knitting a single jersey construction from yarns 35, 36 respectively, and only two additional yarns 37, 38 are laid in. This construction produces a double fabric in the form of a flattened tube with the inlaid yarns held between the fabrics and the fabrics joined at the margins and at intermediate spaced locations by knitted stitches.

FIG. 7 is a diagram of part of a disc-shaped knitted panel showing two sectors 39, 40 having different arrangements of courses. In sector 39, the courses gradually decrease in length from the longest course 41 to the shortest course 42. When the knitting is being carried out with two yarn carriers feeding yarn to alternate courses, then two sets a and b of alternating courses are produced, and the difference in course length between course 41 in set a and the next course 43 in set a is greater than the difference in course length between course 41 in set a and the adjacent course 44 in set b. This comparatively greater difference in course length can give rise to holes in the fabric, and so the preferred course arrangement when knitting from two yarn carriers on alternate courses is that shown in sector 40.

In sector 40, the two sets of courses c and d are more clearly defined with the d courses being shorter on average than the c courses, such that the difference in course length between alternate courses 45 and 46 in set c is less than the difference between the adjacent courses 45 in set c and 47 in set d. This arrangement allows the difference in course length between alternate courses to be reduced and so reduces the risk of hole formation.

The invention is illustrated by the following Examples:

EXAMPLE 1

A tow of "Courtelle" (Trade Mark) acrylic filaments was oxidised under tension in an oven for 3 hours at 218° C., after which time the filaments were blackened throughout and stabilised sufficiently to withstand subsequent carbonisation.

The oxidised tow was passed through an aqueous finish bath containing a standard finish for acrylic fibres (1 percent by weight of Span Tween/Milube A45), the finish being applied at 0.35 percent by weight on the tow weight. The tow was dried and then crimped in a stuffer box to a level of 3.5 crimps per cm.

The crimped tow was converted into a top on a Turbostapler and this was spun into yarn on the worsted system to produce a 2-fold yarn of singles count 88 Tex. This yarn was knitted into a continuous helical fabric on a 7 gauge Dubied JDRPM V-flat weft knitting machine equipped with a presser foot and an additional yarn carrier for laying-in yarn. The fabric was knitted in a 1×1 rib construction in the course pattern shown diagrammatically in FIG. 1 of the drawings, and an identical yarn was laid in along the courses as described in relation to FIG. 3 of the drawings. The resulting fabric had minimal extensibility in the radial direction.

Ten complete turns of the spiral were knitted so that in a collapsed state, the spiral formed a tubular stack of ten inter-connected annular discs. The annular discs had an external diameter of 700 mm and an internal diameter of 200 mm and formed a stack 10 mm thick.

The stack of discs was then held between grid platens to hold it to shape whilst the stack was carbonised in a furnace. Carbonisation was carried out by heating the stack up to a temperature of 1400° C. in an atmosphere of nitrogen for 1 hour.

The carbonised stack was then placed in a carbon vapour deposition furnace, through which was flowed methane gas diluted with nitrogen, at a sub-atmospheric pressure of 20 mm Hg. The stack of discs was inductively heated to 2000° C. to cause carbon deposition from the methane gas on and between the fibres of the fabric discs. This was continued until a substantially continuous matrix of carbon had been built up within and around the stack of discs.

The final carbon fibre fabric/carbon matrix annular component was suitable for use as an aircraft brake disc.

EXAMPLE 2

A 2-fold yarn of singles count 88 Tex was made from oxidised acrylic fibre as described in Example 1. A helical fabric was knitted from this yarn in the same way as in Example 1 and to the same dimensions, with the difference that a course of waste yarn was inserted between each full turn, i.e. at 360° intervals. After knitting, the waste yarn was withdrawn to leave discrete annular discs, each with a radial slit where the two free ends butted.

The discs were assembled into a tubular stack of seven discs, and the stack was then carbonised as in Example 1.

The individual discs were then impregnated with a phenol-formaldehyde resin ("Aerophen" 0808—Ciba Geigy Ltd.) and re-stacked in a mould under pressure. The mould was heated to cure the resin after which the mould was allowed to cool, and the tubular composite structure was removed. It was then placed in a carbonisation furnace where it was heated for one hour at a temperature of 1400° C. in an atmosphere of nitrogen to burn off the resin and leave a carbon residue as a matrix around the carbon fibre discs.

What is claimed is:

1. A fabric panel suitable for reinforcing a matrix material to provide a composite structure which comprises yarn of carbon fibres or oxidised fibres suitable as precursors for carbon fibres and is knitted in courses of varying length which give it the general shape of a disc with the wales lying substantially concentric with the circumference of the disc, and having one or more additional yarns of carbon fibres or oxidised fibres suitable as precursors for carbon fibres, laid in along at least some of the knitted courses.

2. A fabric panel as claimed in claim 1 which comprises a single winding of a continuous helix of knitted fabric.

3. A fabric panel as claimed in claim 1 which comprises a number of sectors of substantially equal size with substantially the same arrangement of knitted courses in each sector.

4. A fabric panel as claimed in claim 3 in which the longest course in each sector is aligned substantially radially of the panel.

5. A fabric panel as claimed in claim 1 knitted in a rib construction.

6. A fabric panel as claimed in claim 1 knitted in an interlock construction.

7. A fabric panel as claimed in claim 1 knitted in a single jersey construction and comprising one of a pair of fabric panels joined at intervals by knitted stitches so as to constitute a double fabric.

8. A fabric panel as claimed in claim 1 having a central aperture.

9. A composite structure comprising a matrix material reinforced by a fabric panel as claimed in claim 1.

10. A composite structure as claimed in claim 9 in which the matrix material comprises a thermosetting resin.

11. A composite structure as claimed in claim 10 in which the matrix material comprises carbon.

12. A brake disc comprising a carbon matrix in which is embedded a stack of fabric panels of carbon fibre yarn, each panel having knitted courses of varying length which give it the general shape of a disc having a central aperture with the wales lying substantially concentric with the circumference of the disc, and having one or more additional yarns of carbon fibres or oxidised fibres suitable as precursors for carbon fibres, laid in along at least some of the knitted courses.

13. A process for making a composite structure comprising knitting fabric panels from yarn comprising oxidised fibres suitable as precursors for carbon fibres by knitting the yarn in courses of varying length to produce generally disc-shaped panel in which the wales lie substantially parallel to the circumference of the disc, and laying in one or more additional yarns comprising oxidised fibres suitable as precursors for carbon fibres, heating the knitted fabric panels to carbonise the fibres, and embedding the panels, singly or as a stack, in a matrix material.

14. A process as claimed in claim 13 comprising knitting the yarn as a continuous helix of fabric of which each winding comprises a generally disc-shaped panel.

15. A process as claimed in claim 14 comprising arranging the continuous helix of fabric with its windings lying against each other in a stack, prior to embedding the stack in a matrix material.

16. A process as claimed in claim 14 comprising knitting the helix of fabric with draw threads connecting its successive windings, and withdrawing the draw threads to split up the helix of fabric into discrete generally disc-shaped fabric panels, prior to embedding said panels, singly or as a stack, in a matrix material.

17. A process as claimed in claim 13 comprising knitting the yarn into the fabric panels on a flat-bed weft knitting machine employing a set of two yarn carriers to feed yarn for knitting as alternate courses of the fabric.

18. A process as claimed in claim 17 comprising knitting the generally disc-shaped fabric panels as a succession of sectors substantially equal in size and each having substantially the same arrangement of courses, and such that each sector comprises two alternating sets of courses both of which progressively change in course length as the knitting proceeds to provide the sector shape, and with the difference in course length between adjacent courses being greater than the difference in course length between alternate courses.

19. A process as claimed in claim 17 in which the additional yarns comprising oxidised fibres suitable as precursors for carbon fibres are laid in along alternate courses using a single yarn carrier.

20. A process as claimed in claim 13 in which the precursor fibres comprise oxidised acrylic fibres and the knitted fabric panels are heated in an inert atmosphere up to a temperature of at least 1000° C. to carbonise the fibres.

21. A process as claimed in claim 13 comprising placing the carbonised fabric panels, singly or as a stack, in an atmosphere of a hydrocarbon gas, and heating the panels in that atmosphere so as to deposit carbon from the gas onto them, and continuing the process until the fabric panels are embedded in a carbon matrix.

22. A process as claimed in claim 13 comprising embedding the carbonised fabric panels in a matrix of a thermosetting resin to form a composite structure and subsequently heating the composite structure to carbonise the resin.

* * * * *